Figure 1:
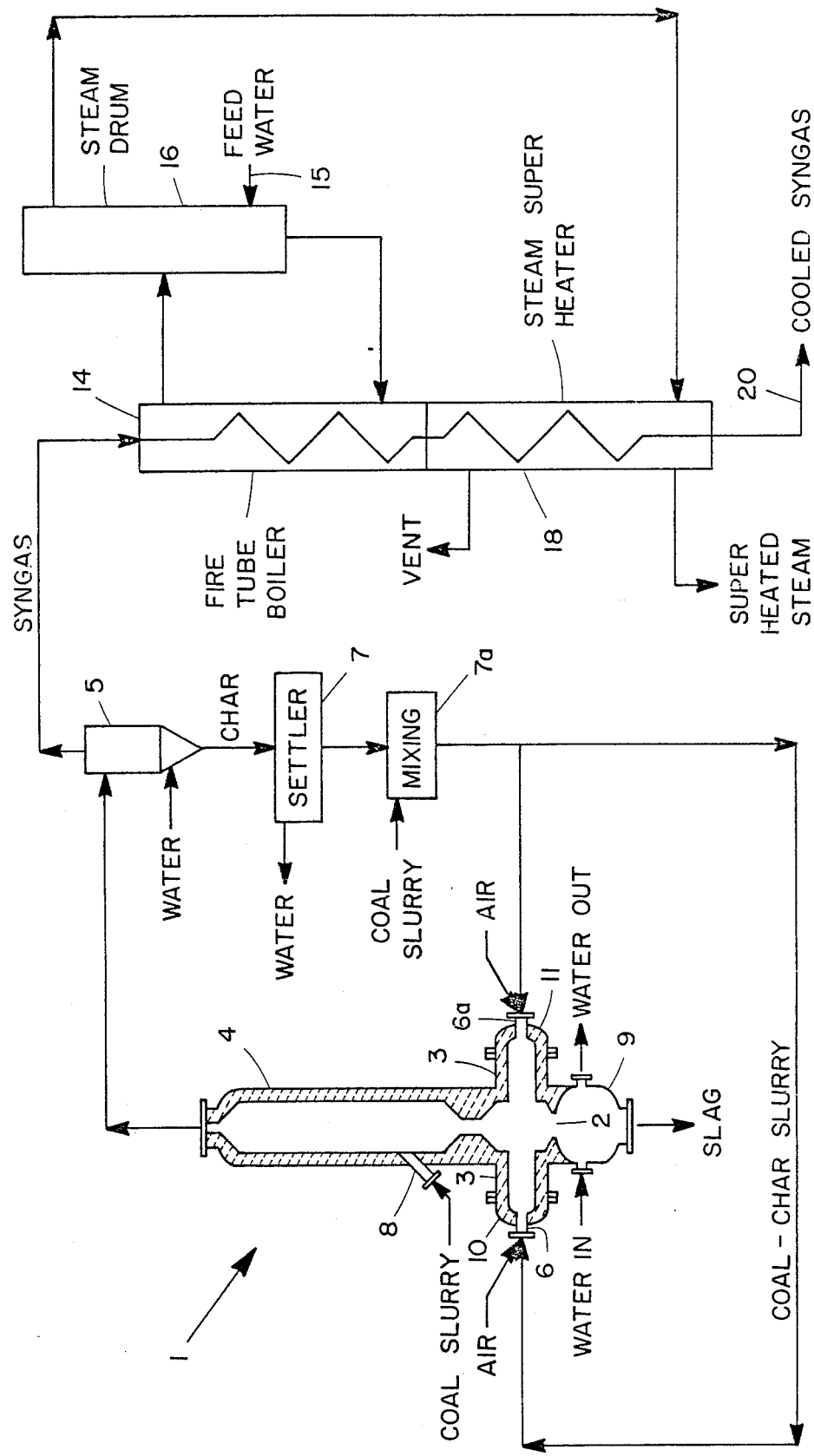

United States Patent [19]

Henley et al.

[11] Patent Number: 4,872,886
[45] Date of Patent: Oct. 10, 1989

[54] TWO-STAGE COAL GASIFICATION PROCESS

[75] Inventors: John P. Henley; Stanley R. Pearson, both of Baton Rouge, La.; Bruce C. Peters, Midland, Mich.; Larry L. LaFitte, Baton Rouge, La.

[73] Assignee: The Dow Chemical Company, Midland, Mich.

[21] Appl. No.: 178,035

[22] Filed: Apr. 5, 1988

Related U.S. Application Data

[63] Continuation-in-part of Ser. No. 803,031, Nov. 29, 1985, abandoned.

[51] Int. Cl.$^4$ .............................................. C10J 3/46
[52] U.S. Cl. .................................. 48/197 R; 48/202; 48/206; 48/209; 48/DIG. 7
[58] Field of Search ................... 48/197 R, 202, 203, 48/206, DIG. 7, 209, DIG. 2, 210; 202/373

[56] References Cited

U.S. PATENT DOCUMENTS

| | | | |
|---|---|---|---|
| 2,716,597 | 8/1955 | Linder | 48/197 R |
| 2,898,204 | 8/1959 | Totzek | 48/203 |
| 2,905,544 | 9/1959 | Totzek | 48/206 |
| 2,920,945 | 1/1960 | Totzek | 48/206 |
| 2,961,310 | 11/1960 | Steever | 48/206 |
| 2,963,354 | 12/1960 | Atwell | 48/206 |
| 2,987,387 | 6/1961 | Carkeek et al. | 48/197 |
| 3,000,711 | 9/1961 | Eastman et al. | 48/763 |
| 3,025,149 | 3/1962 | Eastman et al. | 48/197 |
| 3,544,291 | 12/1970 | Schlinger et al. | 48/206 |
| 3,607,157 | 9/1971 | Schlinger et al. | 48/202 |
| 3,723,345 | 3/1973 | Reynolds | 252/373 |
| 3,779,725 | 12/1973 | Hegarty et al. | 252/373 |
| 3,782,913 | 1/1974 | Donath | 48/202 |
| 3,784,364 | 1/1974 | Slater et al. | 252/373 |
| 3,844,733 | 10/1974 | Donath | 48/202 |
| 3,864,100 | 2/1975 | Blaskowski | 48/73 |
| 3,945,809 | 3/1976 | Donath | 48/73 |
| 3,957,460 | 5/1976 | Lee | 48/197 R |
| 3,979,188 | 9/1976 | McCallister | 48/215 |
| 4,054,424 | 10/1977 | Staudinger et al. | 48/210 |
| 4,060,397 | 11/1977 | Buiter et al. | 48/197 R |
| 4,069,024 | 1/1978 | Fernandes | 48/197 R |
| 4,168,956 | 9/1979 | Blaskowski | 48/203 |
| 4,244,706 | 1/1981 | Forney | 48/202 |
| 4,247,302 | 1/1981 | Woldy et al. | 48/197 R |
| 4,278,445 | 7/1981 | Stickler et al. | 48/197 R |
| 4,278,446 | 7/1981 | Von Rosenberg, Jr. et al. | 48/197 |
| 4,312,639 | 1/1982 | Johnson | 48/210 |
| 4,319,888 | 3/1982 | Blaskowski | 48/77 |
| 4,343,627 | 8/1982 | Tanca | 48/202 |
| 4,430,096 | 2/1984 | Schnur | 48/206 |
| 4,525,175 | 6/1985 | Stellaccio | 48/DIG. 7 |
| 4,547,203 | 10/1985 | Jahnke | 252/373 |
| 4,705,535 | 11/1987 | Lipp | 48/DIG. 7 |

OTHER PUBLICATIONS

Handbook of Gasifiers and Gas Treatment Systems, 1982, pp. 2C.5–2C.9; 2C.18–2C.22; 2C.23–2C.25; 2C.38–2C.40.

Elliott Martin A., Chemistry of Coal Utilization, Second Supplementary Volume, pp. 1711–1736, John Wiley & Sons, New York, 1981.

Kirk–Othmer, Encyclopedia of Chemical Technology, vol. 11, pp. 410–427 and 44–445, 3rd ed., John Wiley & Sons, New York, 1980.

Donath, E. E. and Glenn, R. A., Computer Study of Stage 2 Reactions in the BCR Two–Stage Super–Pressure Coal Gasif. Process., Preprints of Papers presented at CH., 1967, pp. 333–347.

*Primary Examiner*—Peter Kratz
*Attorney, Agent, or Firm*—James M. Pelton

[57] ABSTRACT

A two-stage upflow process for coal gasification and an apparatus useful therefor. An oxygen-containing gas and a first increment of a coal-in-water slurry are ignited in a horizontal fired slagging reactor by means of horizontal coaxial juxtaposed burner nozzles mounted in the reactor, thereby converting the oxygen, the coal, and the water into steam and gaseous combustion products. The discharge from the fired reactor is contacted overhead with a second increment of coal-water slurry in a vertical unfired heat-recovery unit connected to the upper end of the reactor. The heat evolved in the reactor is used in the heat recovery unit to convert the second increment of coal-water slurry into more steam, char and synthesis gas. The gas effluent is separated from the solid char, and synthesis gas is passed into a fire-tube boiler to recover heat and the cooled product gas is recovered as the desired fuel-rich product. The solid char is reslurried and recycled to the fired reactor 3 for further combustion.

10 Claims, 1 Drawing Sheet

TWO-STAGE COAL GASIFICATION PROCESS

CROSS-REFERENCE TO RELATED APPLICATION

This application is a continuation-in-part of application Ser. No. 803,031, filed Nov. 29, 1985, now abandoned.

BACKGROUND OF THE INVENTION

This invention relates to the gasification of carbonaceous materials. More particularly, the invention relates to the conversion of a solid carbonaceous fuel into gaseous products having increased fuel value.

Three basic processes have been developed for the gasification of carbonaceous materials such as coal. They are: (1) fixed-bed gasification, (2) fluidized-bed gasification, and (3) suspension or entrainment gasification. The present invention relates to the third type of process, suspension or entrainment gasification.

An inherent disadvantage of entrainment gasifiers is that they generate hot product gases. The heat must be recovered from the gases in order to utilize fully the heating value of the coal. It is known to quench partial oxidation gasification reactions directly in water or steam according to U.S. Pat. No. 2,957,387, U.S. Pat. No. 3,000,711 and U.S. Pat No. 3,723,345, or to partially cool the effluent gases by indirect heat exchange, as taught in U.S. Pat. No. 3,025,149. However, large amounts of high temperature heat are lost in quenching the effluent gases without enhancing the fuel value of the synthesis gas produced.

Another disadvantage of entrainment gasifiers is that they produce a substantial excess temperature in the gas product which requires quenching or cooling for subsequent heat recovery in conventional radiant heat water tube boilers. Thus, the product gas must be substantially cooled before it can be conducted to heat recovery boilers. As such, substantial quantities of otherwise useful high temperature heat are lost. Further, the capital investment for radiant heat boilers is quite high. Therefore, an alternative heat recovery boiler is an economic necessity for the entrainment gasifier processes.

A further disadvantage of entrainment gasifier processes is that sticky slag particles are carried through the partial gasification reactor and tend to foul the heat transfer surfaces of the heat recovery equipment.

Some of the reactions in a coal gasifier are exothermic and some are endothermic. A coal gasification process in which the heat generated by the exothermic reactions is used to provide the heat required for the endothermic reactions would be extremely desirable and energy efficient. Thus, it is an object of the present invention to provide an exothermic reactor partially oxidizing carbonaceous material with an oxygen-containing gas combined with a unfired second stage reactor to permit the endothermic reactions to proceed efficiently by reacting additional carbonaceous material with water, producing enhanced quality synthesis gas. This and other objects are accomplished in accordance with the present invention as described hereinbelow.

THE INVENTION

In general, the present invention provides a non-catalytic two-stage upflow process for gasification of carbonaceous fuels which produces a non-fouling gas product allowing the use of fire-tube waste heat recovery units. The first stage or step of the process comprises the combustion, in a fired horizontal slagging reaction zone, or first stage reactor, of a stream of oxygen-containing gas and a first increment of a slurry of particulate carbonaceous solids in a liquid carrier. The solids concentration of the slurry may be from 30 to 70 percent by weight. Combustion occurs at a temperature between 2400° F. (1316° C.) and 3000° F. (1649° C.) in the horizontal reactor zone by using opposed, facing horizontal burner nozzles. Preferably, the horizontal burner nozzles are also coaxial, but this is not required. The oxygen, carbonaceous solids and liquid carrier are converted into steam, vapor from the liquid carrier, slag, char, and gaseous combustion products. The slag which forms in the reactor flows by gravity to the bottom of the reactor and out of the reactor through a tap hole.

In the second stage, or step, the steam, vapor from the liquid carrier, char, and gaseous products from the fired horizontal reactor are contacted, in an unfired vertical second stage reactor, with a second increment of slurry of particulate carbonaceous solids in a liquid carrier to yield steam, vapor from the liquid carrier, synthesis gas and char entrained in the gaseous effluent. As used herein, the term "unfired" means that further combustion is not promoted by the addition of a second oxygen-containing gas stream. The vertical second stage reactor does not promote additional combustion and exothermic reactions such as which occur in the fired horizontal reactor. In the vertical second stage reactor, endothermic reactions predominate using heat produced by the combustion in the fired horizontal reactor. The second increment of particulate carbonaceous solids in a liquid carrier is injected into the vertical second stage reactor by means of a nozzle, with steam or other atomizing gas for atomization of the slurry of particulate carbonaceous solids to provide better reaction. Injecting the second increment of slurry at a point downstream of the original injection point reduces the temperature of the gases exiting from the fired horizontal reactor and provides a more efficient use of the heat produced in the process. Thus, while the fired horizontal reactor is primarily a combustion reactor, the vertical second stage reactor is primarily a quench reactor which also increases the heating value of the gases. The solids concentration of the second increment of slurry is from 30 to 70 percent by weight. The temperature of the vertical second stage reactor is from 1600° F. (871° C.) to 2000° F. (1093° C.). In a preferred embodiment of the present process, the unfired vertical second stage reactor is connected directly to the top of the fired horizontal reactor so that the hot reaction products are conveyed directly from the horizontal reactor to the second stage reactor to minimize heat losses in the gaseous reaction products and entrained solids. Direct connection also has the advantage of maintaining temperatures to prevent the slag formed from cooling in the first stage horizontal reactor and forming solid deposits.

The synthesis gas and char entrained in the gaseous effluent from the unfired vertical second stage reactor exit from the top and are separated in a cyclone separator. The char exiting the cyclone separator is mixed with a liquid carrier forming a dilute slurry which is thereafter concentrated in a settling tank to a solids concentration of from 10 to 30 percent by weight. Then from 5 to 20 percent of the concentrated, or recycle, char slurry, based on the total amount of solid carbon fuel to the first stage, is added to the first stage horzontal slagging reactor zone, preferably after mixing with one or more streams of particulate carbonaceous solids comprising the first increment fed to the horizontal fired slagging reactor.

After exiting the cyclone, the gaseous products proceed into high temperature heat recovery system. Usually, such equipment would be a radiant heat type boiler or water-tube boiler, but in this instance the capital investment for such a boiler is extremely high. Therefore, a fire-tube boiler provides the necessary heat exchange capacity with the simplicity of operation and low capital investment involved to advantageously meet the requirements of heat recovery operations. The operation can be augmented by the further addition of a steam superheater.

However, this additional equipment is only practical if the operation of the fired combustion reaction and the unfired second stage reaction step provide a gaseous stream which is non-fouling. The gas also contains small particles of molten slag, of up to 5 micron size, which have an alkaline surface with a slightly lower melting temperature and tend to adhere to interior heat transfer surfaces, then the heat transfer surfaces of the boiler will become quickly fouled, inefficient, and eventually plugged. It is thus essential that the process of the present invention provide a gas product stream which in non-fouling and sufficiently cool to render the sticky slag particles more solid and less sticky. Thus, the present invention should cool the gas product stream to a temperature below the initial deformation temperature of the entrained slag particles in the presence of carbonaceous particulate material upon which the sticky slag can be absorbed.

The Figure of the Drawing is a schematic representation of preferred apparatus useful in and a pictorial process flow diagram for carrying out a preferred embodiment of the process of the present invention.

The following description illustrates the manner in which the principles of the present invention are applied, but is not to be construed in any sense as limiting the scope of the invention.

More specifically, as shown in FIG. 1, first and second streams comprising oxygen or an oxygen-containing gas, such as, for example, air or oxygen-enriched air, and a first increment of a slurry of particulate carbonaceous solids and liquid carrier enter apparatus 1 through mixing nozzles 6 and 6a, respectively. Mixing nozzles 6 and 6a are located oppositely in and extend through ends 10 and 11, respectively, or horizontal fired slagging reactor 3. Within horizontal fired slagging reactor 3, the feed streams are converted exothermically into steam, slag, char, vapor from the liquid carrier, hydrogen, carbon monoxide, carbon dioxide, minor amounts of other gases including methane, ammonia and hydrogen sulfide, and small entrained particles of sticky slag. The bulk of the slag formed as a by-product is drained from the bottom of the reactor 3 through a tap hole 2, to a slag quench section 9 and continuous depressurizing system (not shown). As the steam, char, intermediate gases and entrained by products leave the reactor 3, they flow upward into an unfired second stage reactor 4 where a second increment of a slurry of particulate carbonaceous solids and liquid carrier is injected through nozzle 8. The heat produced in the reactor 3 and carried upward is used to effect the endothermic processes which take place in the unfired second stage reactor 4 including vaporization of the feed water, the carbon-steam reaction and the water-gas reaction between the CO and $H_2O$. The carbon-steam reaction forms CO and $H_2$; thus, increasing the yield of these usable gases. In the water-gas reaction, carbon monoxide reacts with water or steam to form carbon dioxide and additional hydrogen. The reactions occurring in unfired second stage reactor 4 thus enrich the gases emanating from the fired combustion reaction to produce a higher grade of synthesis gas and in doing so recover heat from the combustion reactor and cool the gases sufficiently that the slag entrained is cooled below the ash fusion initial deformation temperature and absorbed on the particulate carbonaceous material. By cooling to below the initial deformation temperature (about 2000°–2100° F. or 1093.9°–1149.9° C.) the entrained slag droplets fuse by themselves or on the particulate material and do not adhere to heat transfer surfaces.

The mixing or two-fluid nozzles 6 and 6a provide an atomized feed of the particulate carbonaceous solids slurry giving more efficient combustion of the carbonaceous solids. Preferably, the nozzles are of the type having a central tube for the slurry and an annular space surrounding the central tube containing the atomizing gas which opens to a common mixing zone internally or externally to provide for the atomization of the slurry. Further, the injection nozzle 8 of the unfired second stage reactor 4 can also be a nozzle of the type described hereinabove. Both mixing nozzles 6 and 6a and injection nozzle 8 can be of the internal or external mixing type, as is conventionally known to those skilled in the art. Exemplary of such nozzles and their use in a process similar to the present invention is the nozzle described in co-pending application Ser. No. 039,493, filed 4/16/87, now abandoned and U.S. Pat. No. 4,679,733, to Lipp, issued July 14, 1987.

As further shown in FIG. 1, the effluent from the unfired second stage reactor 4 is sent to a cyclone separator 5 which splits the effluent into a solids stream and a synthesis gas stream. The gas stream comprises hydrogen, carbon monoxide, a small amount of methane, $H_2 S$, ammonia, water vapor or steam, vapor from the liquid carrier, nitrogen, carbon dioxide and a small amount of particulate char. The solids stream comprises solidified ash and char formed in the unfired second stage reactor 4 or carried over from the horizontal reactor 3. The synthesis gas is then sent to fire-tube boiler 14 to produce steam from boiler feed water provided in feed water line 15 to steam drum 16. Steam produced in boiler 14 is sent to steam superheater 18, which recovers additional heat values and the now much cooler synthesis gas exits the heat recovery system by means of line 20 for further use as the desired fuel-rich product gas, and the char is formed into a low concentration slurry, settled, combined and recycled with fresh carbonaceous solids/liquid carrier slurry and recycled to the reactor 3, as more fully described below.

The solids stream, comprising char and ash, separated from the gas stream in cyclone separator 5, contacts a liquid carrier to form a dilute slurry and goes to a settling vessel 7 for concentration. The settling vessel 7 may include separation and evaporation means (not shown) to provide a more concentrated slurry. A stream exiting vessel 7 forms a recycle char slurry stream. The preferred recycle slurry of char and liquid carrier defines a solids concentration of from 20 to 40 percent by weight, more preferably from 30 to 40 percent by weight. The slurry of char and liquid carrier may have a higher percentage of solids, however, too high a solids concentration makes the feed to fired horizontal reactor 3 too viscous for convenient pumping. It is desirable to mix the recycle slurry of char and liquid carrier with the feed slurry particulate carbonaceous solids and liquid carrier in a mixing vessel 7a before it is transferred into fired horizontal reactor 3 through mixing nozzles 6 and 6a.

The materials of construction of the unfired horizontal stagging reactor 3 and unfired second stage reactor 4 are not critical. Preferably, but not necessarily, the vessel walls are steel and are lined with an insulating castable or ceramic fiber or refractory brick, such as a high chrome-containing brick in the first stage reactor and a dense medium, such as used in blast furnaces and non-slagging applications in the second stage, all of which are commercially available from several sources. Use of this type of system provides the high recovery of heat values from the carbonaceous solids used in the process. Optionally and alternatively, the walls may be unlined by providing a "cold wall" system for fired horizontal reactor 3 and, optionally, unfired second stage reactor 4. The term "cold wall", as used herein, means that the walls are cooled by an external cooling jacket, as is known conventionally in the art for prior art coal gasification systems. In such a system, the slag freezes on the interior wall and provides for protection of the metal walls of the cooling jacket.

The reaction conditions in the process vary with the type of feed and the kind of conversion desired. In general, the temperature of fired horizontal slagging reactor 3 is maintained from 2400° F. (1316° C.) to 3000° F. (1649° C.). At temperatures lower than this, the slag tends to become more viscous and freezes, causing buildup and eventual plugging of the reactor. At temperatures above 3000° F. (1649° C.), reaction occurs readily; however, a less satisfactory product gas is produced, a lower overall thermal efficiency results, and, thus a less economical operation obtains. In unfired second stage reactor 4, a temperature of 1600° F. (871° C.) to 2000° F. (1093° C.) is desirable because at lower temperatures, the conversions of carbonaceous materials to gaseous products are lowered resulting in higher amounts of char production for reslurry and recycle. The upper temperature in unfired second stage reactor 4 depends primarily on the temperature in fired horizontal reactor 3. The hot intermediate product flowing upward from fired horizontal reactor 3 provides heat for the endothermic reactions occurring in the unfired second stage reactor 4. The temperature drop through the fire-tube boiler 14 and steam superheater 18 depends on the entering temperature and the heat transfer surface available. In general, the inlet temperature will be similar to the unfired second stage reactor 4 outlet temperature, typically from about 1600° F. to about 2000° F. (871° C.-1093° C.), and the high temperature heat recovery system, outlet temperature will be typically from about 450° F. to about 550° F. (232° C. to 288.7° C.). Although the temperatures in each portion of the apparatus are important, the specific reaction conditions, per se, are not critical to the process or apparatus of this invention within the given limits, except for the high temperature heat recovery system inlet temperature being below the temperature at which the slag particles produce fouling problems.

The process of this invention is carried out at atmospheric or higher pressures. Generally, the pressure in reactor 3 is from about 50 psig (345 kPa gage) to about 600 psig (4137 kPa gage). At pressures greater than 600 psig (4137 kPa gage), the capital cost of high pressure reaction equipment makes the process economically less attractive; while at pressures lower than 50 psig (345 kPa gage), the throughput of the gaseous products in the reactor 3 and unfired second stage reactor 4 is lower than economically attractive. Preferably, the process runs at pressures of from 100 psig (690 kPa gage) to 400 psig (2760 kPa gage) and, most preferably, from 250 to 400 psig (1724 to 2760 kPa gage).

The process is applicable to any particulate carbonaceous material. Moreover, the nature and concentration of the carbonaceous material in the two stages need not be the same. Preferably, however, the particulate carbonaceous material is coal which, without limitation, includes lignite, bituminous coal, sub-bituminous coal, or any combination thereof. Additional carbonaceous materials are coke from coal, coal char, coal liquefaction residues, particulate carbon, petroleum coke, carbonaceous solids derived from oil shale, tar sands, pitch, concentrated sewer sludge, bits of garbage, rubber and mixtures thereof. The foregoing exemplified materials can be in the form of comminuted solids, and for best materials handling and reaction characteristics, as pumpable slurries in a liquid carrier.

The liquid carrier for carbonaceous solid materials can be any liquid which is capable of vaporizing and participating in the reactions to form desired gaseous products, particularly carbon monoxide and hydrogen. The most readily considered liquid carrier is water which forms steam in both reactor 3 and unfired second stage reactor 4. The steam is capable of reacting with carbon to form gaseous products which are constituents of synthesis gas. In addition, liquids other than water may be used to slurry the carbonaceous material. Preferably, the liquid is water, but it may also be a hydrocarbon such as, for example, fuel oil, residual oil, petroleum, and liquid $CO_2$. When the liquid carrier is a hydrocarbon, additional water or steam may be added to provide sufficient water for efficient reaction and for moderating the reactor temperature.

Any gas containing at least 20 percent oxygen may be used as the oxygen-containing gas fed to fired horizontal reactor 3. Preferred oxygen-containing gases include oxygen, air, and oxygen-enriched air with air as the oxygen-containing gas, the initial atomic ratio of free elemental oxygen to carbon in the reactor 3 is from 1.5:1 to 2.5:1. With oxygen, the ratio is from 1:1 to 2:1.

The concentration of particulate carbonaceous material in the carrier liquid as a slurry is only that necessary to have a pumpable mixture. In general, the concentration ranges up to 70 percent by weight of the solid material. Preferably, the concentration of particulate carbonaceous material in the slurry ranges from 30 percent to 70 percent by weight in both the first and second stages of the process. More preferably, the concentration of coal in aqueous slurry is between 45 and 55 percent by weight.

When coal is the feedstock, it is pulverized before being blended with a liquid carrier to form a slurry. In general, any reasonably finely-divided carbonaceous material may be used, and any of the known methods of reducing the particle size of particulate solids may be employed. Examples of such methods include the use of ball, rod and hammer mills. While particle size is not critical, finely divided carbon particles are preferred. Powdered coal used as fuel in coal-fed power plants is typical. Such coal has a particle size distribution in which 90 percent by weight of the coal passes through a 200 mesh sieve, Tyler series.

The present invention is illustrated by the following illustrative examples, which are not to be construed, in any sense, as limiting the scope of the invention.

EXAMPLE 1

A slurry at 80° F. (26.7° C.) containing 52 percent pulverized subbituminous coal, i.e., Western Coal, and 48 percent water by weight was injected into the fired horizontal reactor 3 at a rate of 52 gallons/minute (196.84 liters/minute) for each of two opposed burner nozzles, together with a stream of air at 950° F. (510° C.) flowing at a rate of 90,000 pounds/hour (40,909 kg/hr). The temperature within the reactor 3 was 2600° F. (1427° C.) and the pressure was 120 psig (827.37 kPa gage). The steam and hot product gases made in the reactor 3 were passed upward into the unfired second stage reactor 4, where they were contacted with a second increment of slurry at 80° F. (26.7° C.) containing 52 percent pulverized subbituminous coal and 48 percent water by weight, flowing at a rate of 20 gallons/minute (75.71 liters/minute), along with atomizing steam at 465° F. (240.6° C.) flowing at a rate of 7,000 pounds/hour (3181.82 kg/hr).

In the unfired second stage reactor 4, the heat generated in the reactor 3 was absorbed by the second increment of slurry, and used to convert the slurry into more steam and gaseous products. The temperature within the unfired second stage reactor 4 was 1800° F. (982° C.). The steam and gaseous products were discharged from the unfired second stage reactor 4 to the cyclone separator 5, where the mixture was separated into a gaseous stream and a solids stream. The discharge from the reactor 3 comprised 10.4 percent hydrogen, 10.4 percent carbon monoxide, 15.0 percent carbon dioxide, 0.04 percent methane, and 65.0 percent nitrogen on a dry basis. The gas stream discharged from the cyclone separator 5 at a rate of 100,000 pounds/hour (45,454.5 Kg/hr) and comprised 11.8 percent hydrogen, 8.8 percent carbon monoxide, 15.4 percent carbon dioxide, 0.5 percent methane, and 63.4 percent nitrogen by volume on a dry basis. The solids were mixed with water at 200°-300° F. (93° to 149° C.) flowing at a rate of 300 gallons/minute (1135.6 liters/minute) to form a slurry which was concentrated to 25 percent solids by weight and recycled to the fired reactor 3 or discharged to waste treatment, as desired.

EXAMPLE 2

A slurry at 80° F. (26.7° C.) containing 50 percent pulverized subbituminous coal and 50 percent water by weight was injected into the fired horizontal reactor 3 at a rate of 52 gallons/minute (196.84 liters/minute), together with a stream of air at 950° F. (510° C.) flowing at a rate of 90,000 pounds/hour (40,909.09 Kg/hr). The temperature within the reactor 3 was 2650° F. (1454° C.) and the pressure was 110 psig (758.42 kPa gage). The steam and hot product gases made in the reactor 3 were passed overhead into the unfired second stage reactor 4, and were there contacted with a second increment of slurry at 80° F. (26.7° C.) containing 40 percent pulverized subbituminous coal and 60 percent water by weight, flowing at a rate of 28 gallons/minute (106 liters/minute), along with atomizing steam at 465° F. (240.6° C.) flowing at a rate of 7,000 pounds/hour (3181.82 kg/hr). In the unfired second stage reactor 4, the heat generated in the reactor 3 ws absorbed by the second increment of slurry, and used to convert the slurry into more steam and gaseous products. The temperature within the unfired second stage reactor 4 was 1800° F. (982° C.). The steam and gaseous products were discharged from the unfired second stage reactor 4 to the cyclone separator 5, where the mixture was separated into a gaseous stream and a solids stream. The gaseous products discharged overhead from the reactor 3 comprised 9.5 percent hydrogen, 10.2 percent carbon monoxide, 16.5 percent carbon dioxide, 0.07 percent methane, and 63.6 percent nitrogen on a dry basis. The gaseous products discharged overhead from the cyclone separator 5 at a rate of 112,000 pounds/hour (50,909 kg/hr) comprised 12 percent hydrogen, 10.0 percent carbon monoxide, 11.0 percent carbon dioxide, 0.5 percent methane and 66.4 percent nitrogen on a dry basis. The solids were mixed with water at 200°-300° F. (93° to 149° C.) flowing at a rate of 300 gallons/minute (1135.6 liters/minute) to form a slurry which was then concentrated to 25 percent solids by weight and recycled to the fired reactor 3 or discharged to waste treatment, as desired.

EXAMPLE 3

In this example, a slurry of pulverized lignite and water was used as feed to a reactor similar to that illustratively shown as the apparatus 1 of FIG. 1. Oxygen of 99.6 percent purity was used as the oxygen-containing gas instead of air.

A slurry at 75° F. (23.9° C.) containing 44.5 percent dry lignite by weight was injected into the fired horizontal reactor 3 at a rate of 2930 pounds/hour (1331.8 kg/hr), together with oxygen at 63° F. (17.2° C.) flowing at a rate of 1621 pounds/hour (736.8 Kg/hr). The temperature within the reactor 3 was 2500° F. (1371° C.), and the pressure was 240 psig (1655 kPa gage). One hundred pounds/hour (45.45 kg/hr) of nitrogen was added to the fired horizontal reactor 3 via instrument purges. The steam and hot product gases generated in the fired horizontal reactor 3 were passed upward into the unfired second stage reactor 4, and were there contacted with a second increment of slurry at 75° F. (23.9° C.) containing 44.5 percent dry lignite by weight flowing at a rate of 874 pounds/hour (397.27 Kg/hr), along with atomizing steam at 465° F. (240.6° C.) flowing at a rate of 161 pounds/hour (73.2 kg/hr). In the unfired second stage reactor 4, heat generated in the fired horizontal reactor 3 was absorbed by the second increment of slurry, and used to convert the slurry into more steam and gaseous products. The temperature within the unfired second stage reactor 4 was 1840° F. (1004° C.). The steam and gaseous products were discharged from the unfired second stage reactor 4 into the cyclone separator 5, where the mixture was separated into a gaseous stream and a solids stream. The solids stream was added to water and discharged. The discharge from the reactor 3 comprised 43.3 percent hydrogen, 26.6 percent carbon monoxide, 23.3 percent carbon dioxide, 0.8 percent methane, and 5.9 percent nitrogen by volume on a dry basis. The gas stream discharged from the cyclone comprised 48.8 percent hydrogen, 22.2 percent carbon monoxide, 23.3 percent carbon dioxide, 2.2 percent methane, and 3.5 percent nitrogen by volume on a dry basis.

EXAMPLE 4

A slurry at 200° F. (93.3° C.) containing 49.5 percent pulverized subbituminous coal and recycled char, the net being 50.5 percent water by weight, was injected into the fired horizontal reactor 3 at a rate of 86 gallons/minute (325.51 liters/minute), together with a stream of oxygen flowing at a rate of 29,200 pounds/hour (13,272.7 kg/hr). The feed slurry was a mixture of 0.926 volume fraction subbituminous coal slurry at 51 percent solids and 0.074 volume fraction char slurry at 30 percent solids. The temperature within the reactor 3 was 2840° F. (1560° C.) and the pressure was 120 psig (827.37 kPa gage). The steam and hot product gases made in the reactor 3 were passed overhead into the unfired second stage reactor 4, and were there contacted with a second increment of slurry at 90° F. (32.22° C.) containing 50 percent pulverized subbituminous coal and 50 percent water by weight, flowing at a rate of 25 gallons/minute (94.6 liters/minute), along with atomizing steam at 465° F. (240.6° C.) flowing at a rate of 7,000 pounds/hour (3181.82 kg/hr). In the unfired second stage reactor 4, the heat generated in the reactor 3 was absorbed by the second increment of slurry, and used to convert the slurry into more steam and gaseous products. The temperature within the heat recovery unit 4 was 1920° F. (1049° C.). The steam and gaseous products were discharged from the unfired second stage reactor 4 to the cyclone separator 5, where the mixture was separated into a gaseous stream and a solids stream. The gaseous products discharged overhead from the reactor 3 comprised 32.7 percent hydrogen, 31.5 percent carbon monoxide, 30.5 percent carbon dioxide, 0 percent methane, and 5.3 percent nitrogen on a dry basis. The gaseous products discharged overhead from the cyclone separator 5 at a rate of 50,504 pounds/hour (22,956.36 kg/hr) comprised 36.1 percent hydrogen, 26.7 percent carbon monoxide, 31.8 percent carbon dioxide, 0.5 percent methane and 4.9 percent nitrogen on a dry basis. The solids from the bottom of the cyclone were mixed with water at 200° to 300° F. (93° to 149° C.) flowing at a rate of 300 gallons/minute (1135.6 liters/minute) to form a slurry which was then concentrated to about 25 percent solids by weight and recycled to the fired reactor 3.

EXAMPLE 5

The following example illustrates that a fire-tube boiler, as shown in the drawing of FIG. 1, will be plugged if the unfired second stage reactor 4 is not employed in the process of the present invention.

A slurry feed rate of 230 gallons per minute (1048.8 liters/minute) at 75° F. (23.9° C.) of 48.7% water and 51.3% Wyoming subbituminous coal with an approximate Ultimate Analysis of 68.5% carbon, 4.7% hydrogen, 0.8% nitrogen, 0.35% sulfur, 19.05% oxygen, and 6.6% ash is used to feed the coal slurry with 1.11 pounds of oxygen per pound of solids (1.11 kg oxygen/kg solids) to an entrained flow, horizontal, fired slagging reactor, such as illustrated in FIG. 1, operated at 2650° F. (1454.7° C.) and 270 psig (1861.6 kPa gage). The process produced 187,400 pounds/hr (85,002.8 kg/hr) of synthesis gas, consisting of 39% hydrogen, 30% carbon dioxide, 28% carbon monoxide, and 3% nitrogen (volume percent). The synthesis gas is quenched upon exiting the reactor, using water to decrease the temperature. The gaseous products are then led to a cyclone to remove char and fly ash, except for small i.e. less than 5 micron size particles of slag and tar products. The gaseous products are then led through an extended enlarged tubular vessel to increase residence time and then enter the fire-tube boiler at about 1670° F. (910.5° C.). After heat recovery in the fire-tube boiler, the synthesis gas is fed to a venturi scrubber, low temperature heat recovery and conventional gas scrubbing equipment to produce a clean gas product for turbine or chemical synthesis.

During operation under the above conditions, the fire-tube boiler plugged to inoperability in 37 hours of operation. The plug consisted of fly ash particles ($\leq 5$ microns in size) stuck together forming larger flow restricting deposits.

EXAMPLE 6

This example illustrates that operation of the unfired second stage reactor 4 in two-stage gasifier shown schematically in FIG. 1 produces synthesis gas which is non-fouling and thus aids in the operation of the fire-tube boiler.

A slurry of 49.5% water and 50.5% Wyoming subbituminous coal having an Ultimate Analysis similar to Example 5 was fed at a rate of 340.3 gallons/min. (1288.2 liters/min.) with a ratio of 1.12 pounds of oxygen/pound of solids (1.12 kg oxygen/kg solids) to the same horizontal, entrained flow, fired slagging reactor as in Example 5. The reactor was operated at 2617° F. (1,436° C.) and 343 psig (about 2365 kPa gage) and produced 244,900 lb/hr (11,085.9 kg/hr) of synthesis gas, analyzing 29.4% carbon monoxide, 1.9% methane, 28.1% carbon dioxide, 38.8% hydrogen, 1.8% nitrogen. This gas stream was quenched by a stream of slurry injected into the unfired second stage reactor 4 at a rate of 33 gallons/minute (124.9 liters/min.). The slurry was also Wyoming subbituminous coal having 46.9% water and 53.1% coal. The gaseous product was further water quenched and then passed through a larger diameter tubular reactor and into the fire-tube boiler at 1751° F. (955° C.) and a superficial tube velocity of 127 feet/sec. (38.7 meters/sec.). The gas exiting the boiler then proceeded through a venturi scrubber, low temperature heat recovery, and conventional gas scrubbing to produce a clean synthetic gas. The product gas did not plug the fire-tube boiler, even after several hundred hours of operation.

EXAMPLE 7

This Example further illustrates the efficacy of the use of unfired second stage reactor 4 to quench the product gases from combustion rector 3, enhance the product gas content, and prevent fouling of the fire-tube boiler.

A slurry of 52.1% water and 47.9% Wyoming subbituminous coal, analyzing the same as that in Example 5 was fed at a rate of 373 gallons/min. (liters/min.) to an entrained flow, horizontal fired slagging reactor with oxygen at a ratio of 1.14 pounds of oxygen per pound of solids. The gasifier operated at 2467° F. (1323.1° C.) and 400 psig (2758 kPa gage). There was produced 266,100 lb/hr (120701 kg/hr) of synthesis gas analyzing 28% carbon monoxide, 1.3% methane, 30% carbon dioxide, 40% hydrogen and 2% nitrogen (dry mole %). The gaseous products passed into the unfired second stage reactor 4 and were quenched to 1700° F. (926.6° C.) by injection of 53.8 gallons/min. (203.7 liters/min.) of slurry having 49% water and 51% Wyoming subbituminous coal of analysis similar to that above. The quenched synthesis gas then passed through a fire-tube boiler an a superficial tube velocity of 108.36 feet/sec. (33.0 meters/sec.) without fouling the fire-tube boiler.

As an additional aspect of this invention there is provided a two-stage reactor which includes an apparatus for the partial oxidation of a slurry of particulate carbonaceous material with an oxygen-containing gas which apparatus comprises (a) a horizontal cylindrical insulated fired slagging reactor closed at both ends and having opposed burners substantially in alignment with the central longitudinal axis of said fired reactor, with a bottom slag tap hole and an upper product gas vent centrally located between said closed ends, (b) a transition piece which is a frustoconical insulated section having an upper outlet and a wider lower inlet aligned with and encompassing said upper vent, and (c) a vertical cylindrical insulated unfired second stage reactor closely communicating with said transition-piece and having a lower inlet encompassing and communicating with said transition piece upper outlet, an injector nozzle for quenching the product gases from said fired reactor, and an upper product gas outlet.

While certain representative embodiments and details have been shown for the purpose of illustrating the present invention, it will be apparent to those skilled in the art that various changes and modifications can be made therein without departing from the spirit and scope of the invention.

What is claimed:

1. A non-catalytic two-stage upflow process for gasification of a carbonaceous material, which process comprises the steps of
    (a) combusting in a fired horizontal slagging reactor a stream comprising an oxygen-containing gas and a first increment of a slurry of particulate carbonaceous material in a liquid carrier at a temperature of between 2400° F. (1316° C.) and 3000° F. (1649° C.) and at a pressure of from 50 psig (345 kPa gage) to 600 psig (4137 kPa gage) by means of opposed horizontal burner nozzles, thereby evolving heat and forming a liquid, molten slag and a gaseous products stream and entrained byproduct sticky, molten slag particles;
    (b) separating said liquid, molten slag;
    (c) contacting, in an unfired vertical second stage, said gaseous products stream and said entrained byproduct sticky, molten slag particles from the fired horizontal reactor with a second increment of a slurry of particulate carbonaceous material in a liquid carrier at a temperature of between 1600° F. (871° C.) and 2000° F. (1093° C.), whereby a substantial portion of the heat evolved in the said step (a) is recovered by converting the second increment of carbonaceous material and carrier liquid into steam, vapor from the carrier liquid, synthesis gas and char, whereby at least a portion of the entrained byproduct sticky, molten slag particles are cooled below the temperature of adherence to heat transfer surfaces and at least a portion of said entrained sticky, molten slag particles are absorbed onto said char preventing the fouling of the downstream heat recovery equipment; and
    (d) recovering another portion of the heat values from said gaseous combustion products in a high temperature heat recovery system, including a fire-tube boiler, whereby the gaseous combustion products are cooled to a temperature of about 450° to about 550° F. (232° to 288.7° C.).

2. The process of claim 1, further comprising the step of:
    (e) recycling to step (a) the char leaving in said step (c) as a suspension in a liquid defining a solids concentration of from 20 percent to 40 percent by weight.

3. The process of claim 2 wherein step (e) further comprises the steps of:
    (e$_1$) separating the char from the synthesis gas;
    (e$_2$) contacting the char with said liquid thereby forming the suspension of char in said liquid; and
    (e$_3$) recycling the char suspension to said fired reactor.

4. The process of claim 1 wherein the carrier liquid is water.

5. The process of claim 1 wherein said slurry of said steps (a) and (c) have a solids concentration from 30 to 70 percent by weight.

6. The process of claim 1 wherein the oxygen-containing gas is air, oxygen-enriched air, or oxygen.

7. The process of claim 1 wherein the oxygen-containing gas is air and the initial atomic ratio of free elemental oxygen to carbon in the reactor is between 1.5:1 and 2.5:1.

8. The process of claim 1 wherein said carbonaceous material is coal or lignite.

9. The process of claim 1 wherein said unfired vertical heat recovery unit is connected to the top of said fired horizontal reactor.

10. The process of claim 5 in which the solids content is from about 45 to about 55 percent by weight in both step (a) and step (b).

* * * * *